May 28, 1940.  S. H. WILLIAMS  2,202,241
AUTOMATIC DIRECTION SIGNAL FOR AUTOMOBILES
Filed May 23, 1938  2 Sheets-Sheet 1
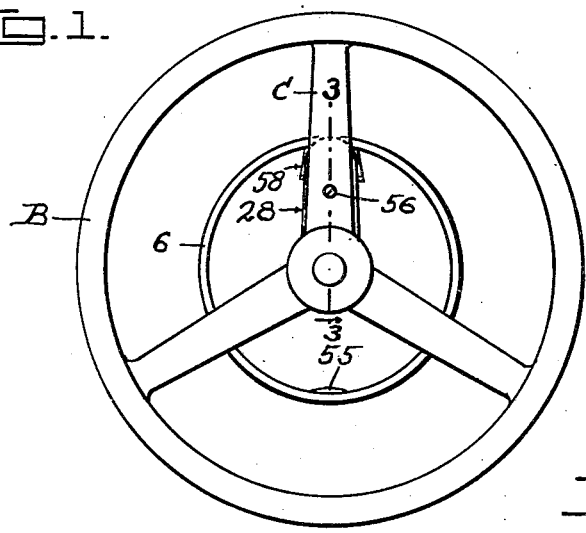
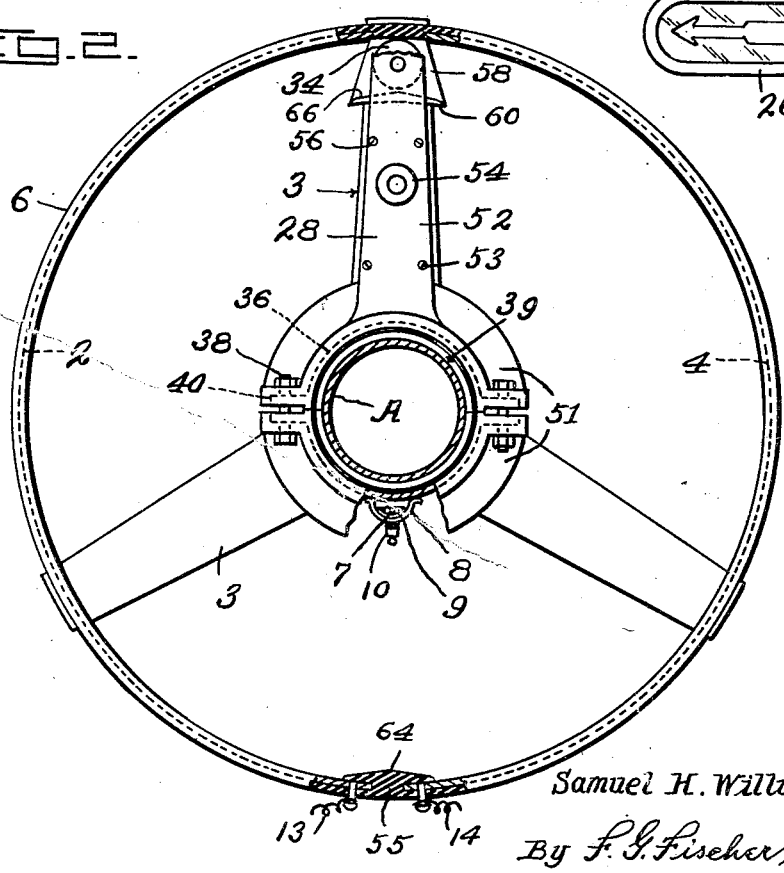
Inventor:
Samuel H. Williams,
By F. G. Fischer,
Attorney.

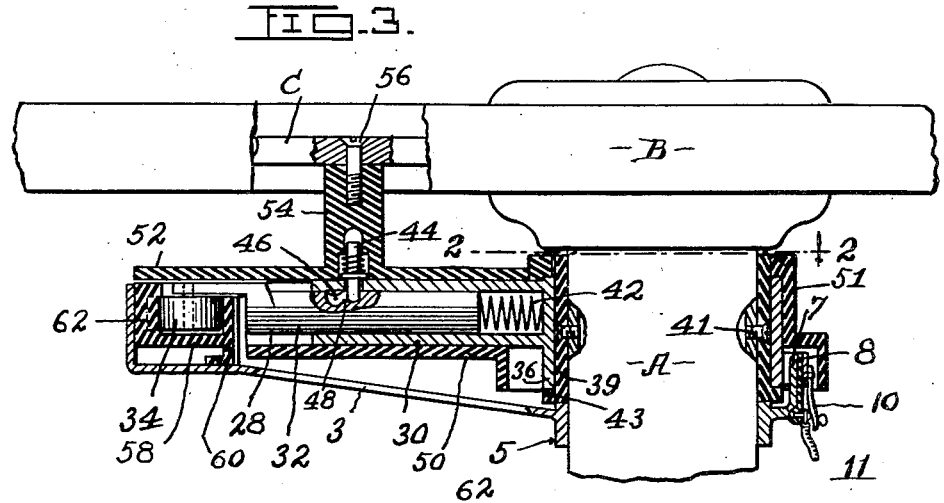
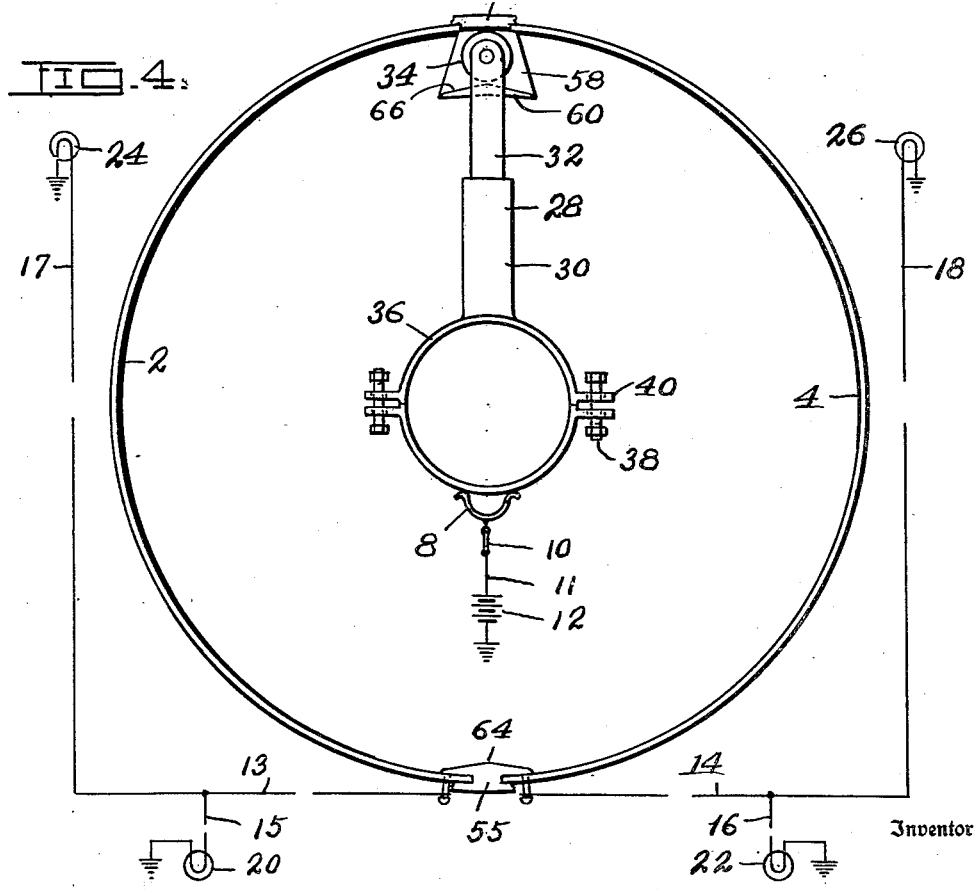

Patented May 28, 1940

2,202,241

UNITED STATES PATENT OFFICE 2,202,241

AUTOMATIC DIRECTION SIGNAL FOR AUTOMOBILES

Samuel H. Williams, Burlington Junction, Mo.

Application May 23, 1938, Serial No. 209,549

11 Claims. (Cl. 200—59)

My invention relates to an automatic signal for automobiles whereby drivers approaching from the front or rear of a car equipped with my signal are warned when said car is about to be turned to the right or left.

An object of the invention is to provide a signal system which may be readily installed at small expense, and is automatic and reliable in operation, so that no attention to the operation of the system will be required on the part of the driver.

A further object of the invention is to free the driver of the necessity of selecting different switches to indicate when he is about to turn to the right or to the left, or to maintain a given signal for any predetermined time.

In carrying out the invention right and left signal circuits are provided, one to indicate a right turn and the other a left turn. A rotary switch controlled through the steering wheel is adapted to close either circuit in accordance with the direction in which said steering wheel is rotated. Slack existing in the steering mechanism allows the steering wheel to turn sufficiently in either direction to display the proper signal in ample time before the car itself begins to turn.

The system being automatic in operation permits the driver to devote all of his attention to turning the car in traffic and also eliminates all danger of the wrong signal being selected.

In order that the invention may be fully understood, reference will now be had to the accompanying drawings, in which:

Fig. 1 is a plan view of the steering wheel with some parts of the invention associated therewith.

Fig. 2 is an enlarged plan view showing the rotary switch and a pair of reversely-disposed segmental contacts associated therewith, the stationary steering post around which the switch is adapted to rotate being in cross section on line 2—2 of Fig. 3.

Fig. 3 is an enlarged broken section on line 3—3 of Fig. 1.

Fig. 4 is a diagram showing the electric circuits.

Fig. 5 is a detail of one of the signal lamps.

In carrying out the invention I provide a pair of segmental contacts 2 and 4 having their front and rear ends spaced apart and their top, bottom and outer peripheries covered with suitable insulating material 6 to prevent the fingers of the driver from touching said contacts. Supporting means for the segmental contacts 2 and 4 consist of a plurality of arms 3 radiating from a centrally-disposed hub 5 and secured at their outer ends to the insulation 6. The segmental contacts 2 and 4 are concentric with the axis of the stationary steering post A and present an almost complete circle to the rolling contact of a rotary switch hereinafter described.

The hub 5 is rigidly secured to the steering post A and provided at its rear portion with an upwardly projecting member 7 carrying a resilient contact 8 separated therefrom with insulation 9. The contact 8 has a manual switch 10 pivoted thereto and adapted to engage the adjacent terminal of a conductor 11 leading from the positive side of an electric source 12 which may be the usual storage battery with which the motor vehicle is equipped.

The segmental contacts 2 and 4 are connected near their rear terminals to signal circuits 13 and 14 which include branch lines 15, 16, and 17, 18, respectively. The branch lines 15 and 16 include signal lamps 20 and 22, respectively, which are located at suitable points on the rear portion of the motor vehicle and in plain view of following drivers. The branch lines 17 and 18 are equipped with signal lamps 24 and 26, respectively, which are located at suitable points on the forward portion of the motor vehicle and in plain view of approaching drivers. All of the lamps may have red signal lenses or they may be in the form shown by Fig. 5, with arrows associated with the lamps 20 and 24 pointing to the left and those associated with the lamps 22 and 26 pointing to the right.

Cooperating with the respective segmental contacts 2 and 4 is a rotary switch designated generally by the numeral 28 and preferably of telescopic form so that it may be contracted and extended to open and close the signal circuits as will hereinafter appear.

The switch 28 may be made in different forms. The one illustrated by the drawings comprises a tubular member 30 and an arm 32, which latter is telescopically mounted in the former and provided at its forward end with a rolling contact 34 for engagement with the inner peripheries of the respective segmental contacts 2 and 4.

The rear end of the tubular member 30 has an annular terminal 36 which is preferably made in two parts (Figs. 2 and 4), removably connected with bolts 38 so that they may be rotatably mounted upon a bushing 39 without necessitating removal of the steering wheel B. The bolts 38 extend through laterally projecting lugs 40 which are positioned at the upper portions of the two parts of the annular terminal 36 to avoid striking the upwardly projecting member 7 on the hub 5 when the switch 28 is rotated. The bushing 39 consists of insulating material and is made in two sections secured to the steering post A with screws 41. A circumferential flange 43 at the lower margin of the bushing serves to support the annular terminal 36 of the tubular switch member 30. Obviously the hub 5, like the terminal 36 and the bushing 39, may comprise two parts so that it may be clamped to the steering post A without requiring removal of the steering wheel B.

The switch arm 32 is normally held in extended position through a coil spring 42 interposed between the rear portion of the tubular member 30 and the adjacent end of the arm 32. When the switch 28 is contracted the arm 32 is held retracted against the action of the spring 42 by means of a spring pressed detent 44 extending downwardly through the tubular member 30 and adapted to enter a depression 46 in said arm 32. A groove 48 communicating at its forward end with the depression 46, coacts with the detent 44 in preventing rotation of the arm 32 in the tubular member 30.

To prevent the fingers of the driver from coming into contact with the rotary switch 28 I enclose the latter in a casing 50 of rubber or other suitable insulating material. The casing 50 is provided with a cover 52 of like material, removably secured in place with screws 53. The cover 52 has an upwardly extending member 54 secured to the forwardly projecting spoke C of the steering wheel B with suitable means such as a screw 56, to insure rotation of the switch 28 with the steering wheel.

The rear portion 51 of the casing 50 is of annular form and like the annular terminal of the tubular switch member 30 is in two parts which may be readily applied to the bushing 39 upon which they are free to rotate and are supported by the circumferential flange 43. The two parts of the casing 50 may be held together with the bolts 38 and their lower portions are enlarged diametrically (Figs. 2 and 3) to shield the contact 8 and prevent the fingers from touching the same.

Contraction of the rotary switch 28 is effected through a retractor 55 interposed between the rear terminals of the segmental contacts 2 and 4 and projecting into the path of the rolling contact 34 to push the same inwardly until the detent 44 enters the depression 46 to hold the switch 28 in contracted position.

Extension of the rotary switch 28 is accomplished with a releasing device 58 interposed between the forward ends of the contacts 2 and 4 and provided with an upwardly extending shoulder 60 arranged in the path of the roller 34, but spaced inwardly far enough to allow the roller to pass between said shoulder 60 and an upward extension 62 at the front end of the releasing device 58.

The retractor 55 and the releasing device 58 consist of insulating material which may be formed integral with the insulation 6 or separate therefrom. The inner faces 64 and 66 of the retractor 55 and shoulder 60, respectively, are of obtuse angular form (Figs. 2 and 4) to prevent jar when contacted by the roller 34.

With the parts arranged as shown and described it is apparent that when the steering wheel B is rotated to the left the rolling contact 34 of the rotary switch 28 will travel around the inner periphery of the segmental contact 2 and thus close the signal circuits at the left so that current will flow from the battery 12 through the conductor 11, manual switch 10, contact 8, switch 28, contact 2, branch wires 13 and 17, and illuminate the signal lamps 20 and 24, and when the steering wheel B is rotated to the right the contact 34 will travel around the inner periphery of the segmental contact 4 and close the circuit through conductor 11, manual switch 10, contact 8, switch 28, segmental contact 4, branch lines 14 and 18, and the signal lamps 22 and 26.

Should it become necessary to rotate the steering wheel B more than a half revolution conflicting signals are prevented from being displayed as contraction of the switch 28 is accomplished when the roller 34 is forced inwardly by the retractor 55. The switch 28 is held in contracted position by the detent 44 to prevent the roller 34 from engaging either of the segmental contacts 2, 4, until released by the releasing device 58.

When the car is parked with the front wheels turned at an angle to the chassis and the rotary switch engaging one of the segmental contacts 2, 4, the manual switch 10 is opened to prevent the battery 12 from becoming exhausted.

From the foregoing it will be readily understood that I have provided an automatic signaling system which is well adapted for the purpose intended, and while I have shown and described one form of the invention I reserve all rights to such changes and modifications thereof as properly fall within the spirit and scope of the invention as claimed.

Having thus described my invention, what I claim and desire to secure by Letters Patent, is:

1. A signal system for motor vehicles comprising a pair of reversely disposed segmental contacts spaced apart and arranged adjacent to and in concentric relation with the steering wheel, said contacts being adapted to have right and left signals connected thereto, means for supporting said contacts, a telescopic switch rotatable with the steering wheel to selectively engage the contacts and thereby effect the operation of the selected direction signal, means associated with the contacts and located in the path of said switch to contract and thereby open the same after the steering wheel has been turned to the right or the left a predetermined distance from a straight-ahead position, means associated with the switch to retain the same in contracted position, and a releasing device associated with the forward terminals of the contacts and provided with a shoulder in the path of said switch to extend the same to normal as the steering wheel is returned to a straight-ahead position.

2. A signal system for motor vehicles comprising a pair of reversely disposed segmental contacts spaced apart and arranged adjacent to and in concentric relation with the steering wheel, means for supporting said contacts, a telescopic switch rotatable with the steering wheel to selectively engage the contacts, a retractor associated with the rear ends of the contacts and having a face of obtuse angular form arranged in the path of said switch to contract and thereby open the same after the steering wheel has been turned to the right or to the left a predetermined distance from a straight-ahead position, means associated with the switch to retain the same in contracted position, and means associated with the contacts for extending the switch to normal as the steering wheel is returned to a straight-ahead position.

3. A signal system for motor vehicles comprising a pair of reversely disposed segmental electric contacts spaced apart and arranged adjacent to and in concentric relation with the steering wheel, means for supporting said contacts, a tubular switch member having an annular rear terminal insulated from but rotatably mounted upon the steering post, an electric contact bearing against the annular terminal of the switch member, a second switch member telescopically mounted in the tubular switch member, resilient means interposed between said switch members to normally hold the switch extended, a detent associated with the switch members for holding the switch in contracted or open position, a rolling contact mounted at the forward end of said second switch member and adapted to engage either of the segmental contacts, means associated with the segmental contacts and located in the path of said rolling contact to contract and thereby open the switch after the steering wheel has been rotated to the right or the left a predetermined distance from a straight-ahead position, and means associated with the segmental contacts for extending the switch to normal as the steering wheel is returned to a straight-ahead position.

4. In a signal system of the character described, a pair of oppositely disposed segmental contacts spaced from a common center and arranged with the ends of one contact adjacent to the ends of the other contact, a rotatable telescopic switch mounted centrally between said contacts, means fixed to two of the adjacent ends of the contacts for extending said switch so that when the same is rotated in one direction it will engage one contact and when rotated in the opposite direction will engage the other contact, means fixed to the other ends of the contacts for contracting the switch to prevent the same from engaging either of the contacts, and means for yieldably holding the switch in contracted position.

5. In a signal system of the character described, a pair of oppositely disposed segmental contacts spaced from a common center and arranged with the ends of one contact adjacent to the ends of the other contact, a rotatable telescopic switch mounted centrally between said contacts, insulating means fixed to two of the adjacent ends of the contacts and having a shoulder for extending said switch so that when the same is rotated in one direction it will engage one contact and when rotated in the opposite direction will engage the other contact, means fixed to the other ends of the contacts for contracting the switch to prevent the same from engaging either of the contacts, and a spring-pressed detent associated with the switch to hold the same in contracted position.

6. In a signal system of the character described, a pair of oppositely disposed segmental contacts spaced from a common center and arranged with the ends of one contact adjacent to the ends of the other contact, a rotatable telescopic switch mounted centrally between said contacts, means fixed to two of the adjacent ends of the contacts for extending said switch so that when the same is rotated in one direction it will engage one contact and when rotated in the opposite direction will engage the other contact, a retractor fixed to the other ends of the contacts to contract the switch and thus prevent the same from engaging either of the contacts, and means for holding the switch in contracted position.

7. In a signal system of the character described, a pair of oppositely disposed segmental contacts spaced from a common center and arranged with the ends of one contact adjacent to the ends of the other contact, a rotatable telescopic switch mounted centrally between said contacts, a roller contact on said switch for engagement with either of the segmental contacts, means fixed to two of the adjacent ends of the contacts for extending said switch so that when the same is rotated in one direction it will engage one contact and when rotated in the opposite direction will engage the other contact, and means fixed to the other ends of the contacts for contracting the switch to prevent the same from engaging either of the contacts, and means for yieldably holding the switch in contracted position.

8. In a signal system of the character described, a pair of oppositely disposed segmental contacts spaced from a common center and arranged with the ends of one contact adjacent to the ends of the other contact, a rotatable telescopic switch mounted centrally between said contacts, means fixed to two of the adjacent ends of the contacts and provided with a shoulder for extending said switch so that when the same is rotated in one direction it will engage one contact and when rotated in the opposite direction will engage the other contact, means associated with the switch for yieldably holding the same in extended position, means fixed to the other ends of the contacts for contracting the switch to prevent the same from engaging either of the contacts, and means associated with the switch for holding the same in retracted position.

9. In a signal system of the character described, a pair of oppositely disposed segmental contacts spaced from a common center and arranged with the ends of one contact adjacent to the ends of the other contact, a rotatable telescopic switch mounted centrally between said contacts, means fixed to two of the adjacent ends of the contacts for extending said switch so that when the same is rotated in one direction it will engage one contact and when rotated in the opposite direction will engage the other contact, spring means associated with the switch for yieldably holding the same in extended position, means fixed to the other ends of the contacts for contracting the switch to prevent the same from engaging either of the contacts, and a detent associated with the switch for holding the same in retracted position.

10. The combination with a rotary steering wheel and supporting column of a pair of segmental electrical contacts concentrically arranged about the column with two adjacent ends disposed in front of the column and their other ends disposed in the rear of said column, means for securing said contacts to the column, insulating means interposed between and uniting the ends of said contacts, an expansible switch rotatably mounted upon the column to effect engagement with the respective contacts to complete electric signal circuits, means for securing said switch to the steering wheel, means for yieldably holding the switch in contracted position, releasing means on the front insulating means to allow the switch to expand for engagement with either contact, and means on the rear insulating means for contracting the switch to prevent the same from engaging either contact.

11. In a signal system of the character described, a pair of segmental electrical contacts disposed at opposite sides of a common center and adapted to have right and left signal circuits connected thereto, a telescopic switch rotatably mounted between said contacts to effect engagement therewith to complete the signal circuits, an insulator interposed between two adjacent ends of the contacts and having an angular face adapted to extend the switch for engagement with either contact, an insulator interposed between the other adjacent ends of the contacts and having an angular face to contract the switch to prevent it from engaging either contact, and means for yieldably holding the switch in contracted position.

SAMUEL H. WILLIAMS.